US012573013B2

(12) United States Patent
Kwong et al.

(10) Patent No.: US 12,573,013 B2
(45) Date of Patent: Mar. 10, 2026

(54) REGION-OF-INTEREST (ROI)-BASED IMAGE ENHANCEMENT USING A RESIDUAL NETWORK

(71) Applicant: ATI TECHNOLOGIES ULC, Markham (CA)

(72) Inventors: Tung Chuen Kwong, Markham (CA); Ying Liu, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 470 days.

(21) Appl. No.: 17/855,288

(22) Filed: Jun. 30, 2022

(65) Prior Publication Data

US 2024/0005458 A1    Jan. 4, 2024

(51) Int. Cl.
G06T 5/77 (2024.01)

(52) U.S. Cl.
CPC ...... G06T 5/77 (2024.01); G06T 2207/10016 (2013.01); G06T 2207/20084 (2013.01)

(58) Field of Classification Search
CPC ............. G06T 5/77; G06T 2207/10016; G06T 2207/20084; G06T 7/11; G06T 3/4053; G06T 9/002; G06T 5/00; G06T 5/60; G06T 7/70; G06T 5/001; G06T 3/40; G06T 5/50; G06T 3/4046; H04N 19/167; H04N 19/17; H04N 9/646; H04N 19/169; H04N 19/33; G06N 3/088; G06N 3/08; G06N 3/084; G06N 3/0464; G06N 3/02; G06N 20/00; G06V 10/25; G06V 10/82; G06V 10/40; G06V 20/49; G06V 10/70; G06V 10/26

See application file for complete search history.

(56) References Cited

U.S. PATENT DOCUMENTS

| | | | | |
|---|---|---|---|---|
| 8,498,413 B2 * | 7/2013 | Kita | ...................... | G06F 21/608 |
| | | | | 380/243 |
| 10,496,899 B1 * | 12/2019 | Kim | ...................... | G06F 18/214 |
| 11,288,535 B1 * | 3/2022 | He | ........................... | G06V 10/44 |
| 11,978,189 B2 * | 5/2024 | Jiang | ...................... | G06T 7/0004 |
| 12,092,780 B2 * | 9/2024 | Iqbal | ...................... | G01V 1/288 |
| 12,206,869 B2 * | 1/2025 | Habibian | ............. | H04N 19/184 |
| 12,400,297 B2 * | 8/2025 | Hamida | ................ | G06T 3/4053 |
| 12,423,975 B2 * | 9/2025 | Liu | .......................... | G06T 7/248 |
| 2005/0259975 A1 * | 11/2005 | Naitoh | ................... | G11B 27/36 |
| | | | | 386/234 |

(Continued)

FOREIGN PATENT DOCUMENTS

| | | | | | |
|---|---|---|---|---|---|
| CN | 110033410 A | * | 7/2019 | ........... | G06T 3/4053 |
| CN | 114898092 B | * | 5/2025 | ........... | G06F 18/253 |

OTHER PUBLICATIONS

Cai; Chunlei et al. "End-to-End Optimized ROI Image Compression", Dec. 2019, IEEE (Year: 2019).*

(Continued)

*Primary Examiner* — Aaron W Carter
*Assistant Examiner* — Alejandro Hernandez

(57) ABSTRACT

Region-of-interest (ROI)-based image enhancement using a residual network, including: generating, based on an input image and a residual path of a residual network, a first output corresponding to a region-of-interest of the input image; generating, based on the input image and a skip path of the residual network, a second output; and generating an output image based on the first output and the second output.

19 Claims, 10 Drawing Sheets

(56)  References Cited

U.S. PATENT DOCUMENTS

| | | | | |
|---|---|---|---|---|
| 2014/0337903 A1* | 11/2014 | Zhu | H04N 21/2387 | |
| | | | | 725/90 |
| 2017/0272771 A1* | 9/2017 | Edpalm | H04N 19/17 | |
| 2019/0035101 A1* | 1/2019 | Kwant | G06V 20/588 | |
| 2019/0355103 A1* | 11/2019 | Baek | G06N 3/0895 | |
| 2020/0334287 A1* | 10/2020 | Xu | G06N 3/08 | |
| 2020/0349681 A1* | 11/2020 | Andrei | G06N 3/088 | |
| 2021/0042564 A1* | 2/2021 | Xiao | G16H 50/70 | |
| 2021/0342977 A1* | 11/2021 | Xia | G06V 10/82 | |
| 2022/0044452 A1* | 2/2022 | Wang | G06N 3/094 | |
| 2022/0133240 A1* | 5/2022 | Zhu | A61B 5/7264 | |
| | | | | 600/410 |
| 2022/0287671 A1* | 9/2022 | Huang | A61B 6/037 | |
| 2022/0343496 A1* | 10/2022 | Zhang | G06V 30/194 | |
| 2022/0343623 A1* | 10/2022 | Li | G06T 7/11 | |
| 2023/0005247 A1* | 1/2023 | Ohara | G06V 10/776 | |
| 2023/0033442 A1* | 2/2023 | Xiang | G06N 3/044 | |
| 2023/0081601 A1* | 3/2023 | Wang | G06V 10/25 | |
| | | | | 378/96 |
| 2023/0222671 A1* | 7/2023 | Kim | G06V 10/22 | |
| | | | | 382/103 |
| 2023/0281762 A1* | 9/2023 | Nasrabadi | G06V 40/1347 | |
| | | | | 382/100 |
| 2024/0031580 A1* | 1/2024 | Kang | H04N 19/513 | |
| 2024/0062530 A1* | 2/2024 | Panetta | G06V 10/7715 | |
| 2024/0064318 A1* | 2/2024 | Letunovskiy | H04N 19/42 | |
| 2024/0104698 A1* | 3/2024 | Nie | G06N 3/044 | |
| 2025/0140021 A1* | 5/2025 | Luo | G06V 40/20 | |
| 2025/0201345 A1* | 6/2025 | Chung | G06T 7/0012 | |

OTHER PUBLICATIONS

He et al., Deep Residual Learning for Image Recognition, Conference: 2016 IEEE Conference on Computer Vision and Pattern Recognition (CVPR), URL: https://openaccess.thecvf.com/content_cvpr_2016/papers/He_Deep_Residual_Learning_CVPR_2016_paper.pdf, DOI: 10.1109/CVPR.2016.90, IEEE Xplore, dated Jun. 2016, 9 pages.

Hoffman et al., Limits of peripheral acuity and implications for VR system design, Journal of Society for Informational Display, 26(7), URL: https://storage.googleapis.com/pub-tools-public-publication-data/pdf/8818d20c636be007e569272a397f09c28c79e943.pdf, DOI: 10.1002/jsid.730, dated Aug. 2018, 13 pages.

Kim et al., Accurate Image Super-Resolution Using Very Deep Convolutional Networks, 2016 IEEE Conference on Computer Vision and Pattern Recognition (CVPR), IEEE Xplore, DOI: 10.1109/CVPR.2016.182, URL: https://arxiv.org/pdf/1511.04587.pdf, dated Nov. 2015, 10 pages.

Song et al., Dynamic Residual Dense Network for Image Denoising, Sensors 19(17):3809, MDPI, DOI: 10.3390/s19173809, dated Sep. 2019, 14 pages.

Wang et al., EDVR: Video Restoration with Enhanced Deformable Convolutional Networks, 2019 IEEE/CVF Conference on Computer vision and Pattern Recognition Workshops (CVPRW), URL: https://arxiv.org/pdf/1905.02716.pdf, DOI: 10.1109/CVPRW.2019.00247, dated May 2019, 10 pages.

Yang et al., Deep Learning for Single Image Super-Resolution: A Brief Review, IEEE, IEEE Transactions on Multimedia, vol. 21, Issue 12, URL: https://arxiv.org/pdf/1808.03344.pdf, DOI: 10.1109/TMM.2019.2919431, dated Dec. 2019, 16 pages.

* cited by examiner

102

104

104

114b

114a

112

REGION-OF-INTEREST (ROI)-BASED IMAGE ENHANCEMENT USING A RESIDUAL NETWORK

BACKGROUND

Neural networks are used to perform image enhancements on input images. Neural networks that produce higher quality outputs generally use more computational and power resources compared to other networks. While a neural network that requires fewer computational and power resources, the resulting output is of reduced quality.

DETAILED DESCRIPTION

Figure 1:
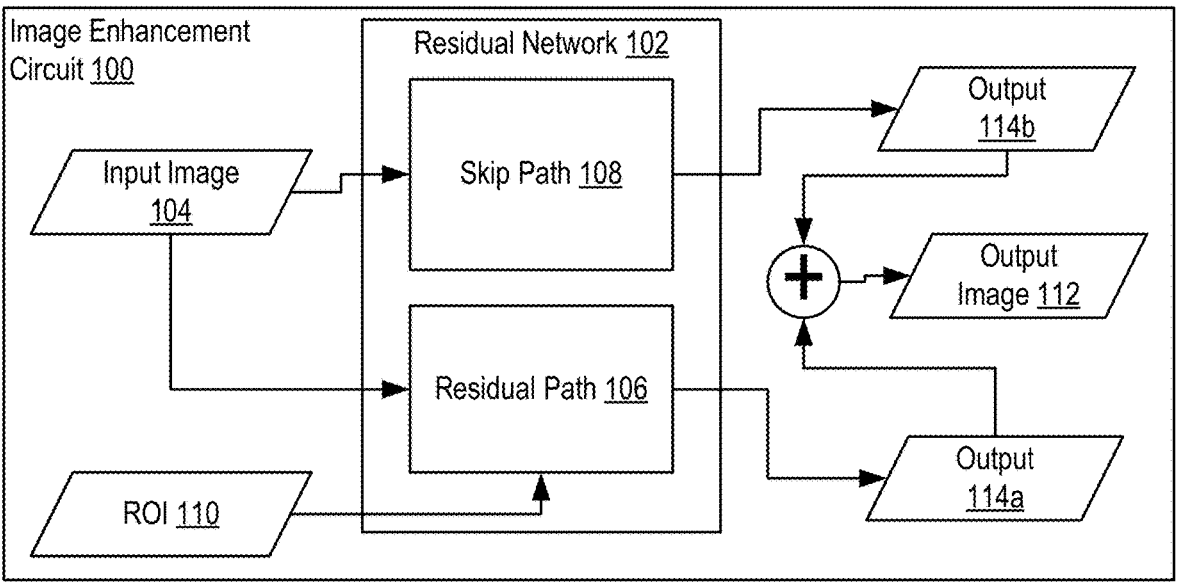
FIG. 1 is a diagram of an example image enhancement circuit for region-of-interest (ROI)-based image enhancement using a residual network according to some implementations.

Neural networks are used to perform image enhancements on input images. Neural networks that produce higher quality outputs generally use more computational and power resources compared to other networks. While a neural network that requires fewer computational and power resources, the resulting output is of reduced quality. More-over, while an input image may include objects or regions of varying importance, these neural networks are not usable on arbitrarily selected portions of an image.

To that end, the present specification sets forth various implementations for region-of-interest (ROI)-based image enhancement using a residual network. In some implementations, a method of region-of-interest (ROI)-based image enhancement using a residual network includes generating, based on an input image and a residual path of a residual network, a first output corresponding to a region-of-interest of the input image; generating, based on the input image and a skip path of the residual network, a second output; and generating an output image based on the first output and the second output.

In some implementations, the region-of-interest includes a segmentation mask. In some implementations, the residual network includes an image enhancement neural network. In some implementations, the method further includes performing a backpropagation of the residual path based on the region-of-interest, including identifying, for each layer of the residual path, a corresponding input feature map subspace based on the region-of-interest. In some implementations, performing the backpropagation further includes storing, for each layer of the residual path, subspace metadata describing the corresponding input feature map subspace. In some implementations, generating the first output includes processing, for each layer of the residual path, the corresponding input feature map subspace described in the subspace metadata. In some implementations, the input image includes a frame of video data, and the region-of-interest includes a dynamic region-of-interest that is variable across a plurality of frames of the video data.

The present specification also describes various implementations of an apparatus for region-of-interest (ROI)-based image enhancement using a residual network. Such an apparatus includes a computer processor, a computer memory operatively coupled to the computer processor, the computer memory having disposed within it computer program instructions that, when executed by the computer processor, cause the apparatus to carry out steps including: generating, based on an input image and a residual path of a residual network, a first output corresponding to a region-of-interest of the input image; generating, based on the input image and a skip path of the residual network, a second output; and generating an output image based on the first output and the second output.

In some implementations, the region-of-interest includes a segmentation mask. In some implementations, the residual network includes an image enhancement neural network. In some implementations, the steps further include performing a backpropagation of the residual path based on the region-of-interest, including identifying, for each layer of the residual path, a corresponding input feature map subspace based on the region-of-interest. In some implementations, performing the backpropagation further includes storing, for each layer of the residual path, subspace metadata describing the corresponding input feature map subspace. In some implementations, generating the first output includes processing, for each layer of the residual path, the corresponding input feature map subspace described in the subspace metadata. In some implementations, the input image includes a frame of video data, and the region-of-interest includes a dynamic region-of-interest that is variable across a plurality of frames of the video data.

Also described in this specification are various implementations of a computer program for region-of-interest (ROI)-based image enhancement using a residual network. Such a computer program product is disposed upon a non-transitory computer readable medium including computer program instructions for that, when executed, cause a computer system to perform steps including: generating, based on an input image and a residual path of a residual network, a first output corresponding to a region-of-interest of the input image; generating, based on the input image and a skip path of the residual network, a second output; and generating an output image based on the first output and the second output.

In some implementations, the region-of-interest includes a segmentation mask. In some implementations, the residual network includes an image enhancement neural network. In some implementations, the steps further include performing a backpropagation of the residual path based on the region-of-interest, including identifying, for each layer of the residual path, a corresponding input feature map subspace based on the region-of-interest. In some implementations, performing the backpropagation further includes storing, for each layer of the residual path, subspace metadata describing the corresponding input feature map subspace. In some implementations, generating the first output includes processing, for each layer of the residual path, the corresponding input feature map subspace described in the subspace metadata.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

FIG. 1 is a diagram of an example image enhancement circuit 100 for region-of-interest (ROI)-based image enhancement using a residual network according to some implementations of the present disclosure. The example image enhancement circuit 100 can be implemented in a variety of computing devices, including mobile devices, personal computers, peripheral hardware components, gaming devices, set-top boxes, and the like. The image enhancement circuit 100 implements a residual network 102. The residual network 102 accepts, as input, an input image 104. The input image 104 includes any digitally encoded image as would be appreciated by one skilled in the art. For example, in some implementations, the input image 104 is one of multiple frames of video data.

The residual network 102 is a neural network such as a convolutional neural network or other type of neural network as can be appreciated. Accordingly, the residual network 102 includes multiple layers that each accept some input and provide some output. For example, a first layer or "input layer" accepts the input image 104 as input. The residual network 102 is considered a "residual" neural network in that there are multiple usable paths for processing input and producing output. For example, the residual network 102 includes a residual path 106 whereby an input is processed by some number of layers in the residual network 106. The residual network 102 also includes a skip path 108 whereby the input is processed by a subset of the layers included in the residual path 106. In other words, input processed by the skip path 108 skips some number of layers of the residual path 106, thereby incurring a lower computational cost and power usage when compared to the residual path 106.

Figure 2:
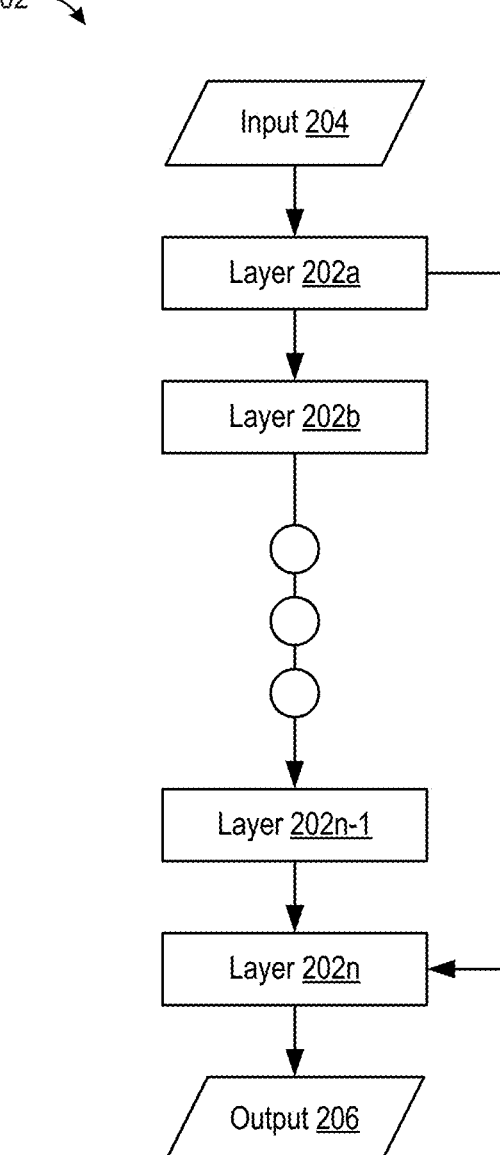
FIG. 2 is a diagram of an example residual network for region-of-interest (ROI)-based image enhancement using a residual network according to some implementations.

A non-limiting example structure for the residual network 102 is shown in FIG. 2. Here, the residual network 102 includes multiple layers 202a, 202b, 202n−1, 202n. The layer 202a accepts input 204 and the layer 202n produces an output 206. In this example residual network 102, a residual path 106 uses each layer 202a,b,n−1,n to produce the final output 206. A skip path 108 of the example residual network 102 uses layers 202a,202n to produce the final output 206, skipping layers 202b-202n−1. One skilled in the art will appreciate that the layout of the residual network 102 of FIG. 2 is merely exemplary and illustrative, and that other configurations of layers 202a-n, as well as configurations for residual paths 106 and skip paths 108 are also contemplated within the scope of the present disclosure.

Figure 3:
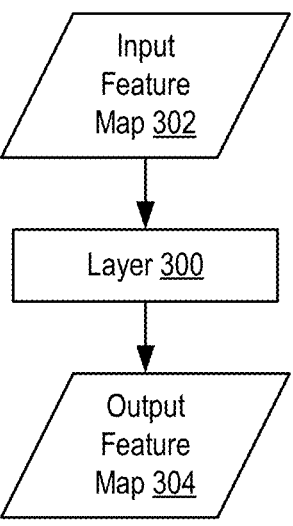
FIG. 3 is a diagram of an example residual network layer for region-of-interest (ROI)-based image enhancement using a residual network according to some implementations.

FIG. 3 describes the example inputs and outputs for a given layer 300 of the residual network 102. For example, the layer 300 corresponds to any layer of a residual network 102, such as the layers 202a-n of FIG. 2. The layer 300 accepts, as input, an input feature map 302. An input feature map 302 includes multiple data points provided as input to the layer 300. For example, different data points in the input feature map 302 will be provided as input to different neurons or other subcomponents of the layer 300. In some implementations, the input feature map 302 is encoded as an array or matrix with each cell corresponding to a particular pixel (e.g., of an input image 104, of an output image 112, or some intermediary image or collection of data during use of the residual network 102). As an example, each cell may include one or multiple values describing particular attributes or encoding particular data values for a particular pixel or other subset of an image.

The layer 300 provides, as output, an output feature map 304. The output feature map 304 is encoded similar to the input feature map 304 but is used to describe the output from a particular layer 300. As is set forth above, the residual network 102 includes multiple layers 300. Each layer 300 accepts input from a preceding layer 300, provides output to a successive layer 300, or both. Thus, the input feature map 302 for some layers 300 is the output feature map 304 of a preceding layer 300, and the output feature map 304 for some layers 300 serves as the input feature map 302 for a successive layer 300. A first layer 300 in the residual network 102 (e.g., the layer 202a of FIG. 2) is considered an "input" layer 300. The input feature map 302 for the input layer 300 is the input 204 of FIG. 2, or some derivation of the input 204 after preprocessing and the like. A last layer 300 in the residual network 102 (e.g., the layer 202n of FIG. 2) is considered an "output" layer 300. The output feature map 302 for the output layer 300 is the output 306 of FIG. 2.

Turning back to FIG. 1, both the residual path 106 and skip path 108 perform some image processing or enhancement process on the input image 104, such as sharpening, denoising, upscaling, and other image processing functions as can be appreciated. While, in some implementations, the residual path 106 produces an output of a perceptibly higher quality than the skip path 108, use of the residual path 106 incurs a higher computational cost compared to the skip path 108.

Accordingly, the image enhancement circuit 100 selectively uses the residual path 106 on a portion of the input image 104 whose resulting output (encoded in an output image 112, described in further detail below) corresponds to a region-of-interest (ROI) 110. The ROI 110 is a sub-area of the input image 104 identified for a particular purpose. For example, in some implementations the ROI 110 corresponds to a portion of the image 104 indicating as having particular importance, such as an identified area of a medial image, a face or human subject of a frame of video, and the like. In some implementations, the ROI 110 is embodied or encoded as a segmentation mask for the input image 104.

In order to selectively use the residual path 106, in some implementations, the image enhancement circuit 100 performs a backpropagation of the residual path 106. To begin, the image enhancement circuit 100 identifies which portions of the output of the residual path 106 (e.g., the output feature map 304 of the output layer 300) correspond to the ROI 110. In other words, the image enhancement circuit 100 determines which values of the output feature map 304 are encoded as or otherwise affect pixels in the ROI 110. A subset of values from an output feature map 304 is hereinafter referred to as an output feature map 304 subspace. Thus, the image enhancement circuit 100 identifies the output feature map 304 subspace corresponding to the ROI 100.

The image enhancement circuit 100 then identifies, for the output layer 300, a subset of the input feature map 302 (e.g., an input feature map 302 subspace) corresponding to the identified output feature map 304 subspace. The input feature map 302 subspace corresponding to the output feature map 304 subspace includes those values in the input feature map 302 that are factors in calculating the values in the output feature map 304 subspace. In some implementations, after determining the input feature map 302 subspace for the output layer 300, the image enhancement circuit 100 stores subspace metadata identifying the input feature map 302 subspace for the output layer 300.

The backpropagation then moves to the preceding layer 300 (e.g., some intermediary layer 300), and repeats the process described above for each layer 300. That is, for a given layer 300, the image enhancement circuit 100 identifies an input feature map 302 subspace for the identified output feature map 304 subspace for that layer 300 (e.g., the identified input feature map 302 subspace for the successive layer 300). In other words, for a given layer 300, the image enhancement circuit 100 identifies the input feature map 302 subspace whose values are factors in calculating an output feature map 304 subspace matching the identified input feature map 302 subspace for the next layer 300. As an example, identifying the input feature map 302 subspace for a given layer 300 includes accessing subset metadata describing the input feature map 302 subspace of the successive layer 300. Accordingly, in some implementations, for each layer 300, the identified input feature map 302 subspace is stored as subset metadata. Once the backpropagation has processed the input layer 300, the input feature map 302 subspace for the input layer 300 corresponds to a subset of the input image 104. Thus, for each layer 300, an input feature map 302 subspace is identified whose values affect the ROI 110 of the residual path 106 output.

The image enhancement circuit 100 then performs a forward inference of the residual path 106 to generate a first output 114a. At each layer 300 of the residual path 106, an input feature map 302 subspace is selected from the input feature map 302 provided to the layer 300. As an example, for each layer, subspace metadata for that layer 300 is accessed. The input feature map 302 subspace described in the subspace metadata is then selected from the input feature map 302. The selected input feature map 302 subspace is then provided as input to the layer 300 for processing. As an example, the input feature map 302 subspace is subdivided into multiple tensors or other subunits of data and provided to a hardware accelerator (e.g., a graphics processing unit (GPU), a machine learning accelerator, and the like) for processing by the layer 300. As the layer 300 is only processing the identified input feature map 302 subspace for that layer 300, in some implementations, the resulting output feature map 304 for that layer will include null values, zero values, default values, and the like due to the unprocessed portions of the input feature map 302.

The forward inference of the residual path 106 described above limits processing by each layer 300 to those values that will ultimately affect the ROI 110. The resulting output 114a corresponds to the ROI 110 (e.g., encoding the identified particular area after processing by the residual path 106). This approach allows for an ROI 110 to be processed using the computationally intensive residual path 106, without expending resources on processing portions of an input image 104 that are not included in nor affect the ROI 110.

The residual network 102 also performs a forward inference on the skip path 108 using the input image 104. In some implementations, the forward inference on the skip path 108 is performed sequentially before or after the forward inference on the residual path 106. In some implementations, the forward inference on the skip path 108 is performed at least partially in parallel to the forward inference on the residual path 106. Thus, the full input image 104 is provided to the skip path 108, with each layer in the skip path 108 processing a full input feature map 302. The output 114b of the skip path 108 thus includes a version of the complete input image 104 processed via the skip path 108.

The output 114a and output 114b are combined to create an output image 112. For example, in some implementations, the pixels from the output 114a (e.g., corresponding to the ROI 110) are mapped onto the output 114b at their corresponding locations to produce an output image 112. The resulting output image 112 then includes an area corresponding to the ROI 110 that has been processed using the higher-quality, computationally expensive residual path 106 and a remaining area processed by the lesser-quality, computationally cheaper skip path 108. Thus, the ROI 110 benefits from the enhanced quality of the residual path 106 while saving resources on the remainder of the output image 112. The output image 112 is eventually rendered on a display. In some variations, the output image 112 is provided to a graphics processing unit that renders the output image on a display. In some variations, the ROI-based image enhancement is carried out by a GPU or a circuit of a GPU, such as the image enhancement circuit of FIG. 1 implemented as a component of a GPU. In some variations, the output image 112

Although the approaches set forth above describe using the residual network 102 to enhance a single input image 104, it is understood that, in some implementations, the approaches set forth above are applicable to a sequence of input images 104, such as multiple frames of video data. In some implementations, the ROI 110 will change across input images 104 (e.g., across frames). Accordingly, in some implementations, the ROI 110 is recalculated for each input image 104 to be processed (e.g., using particular object identifying algorithms or models, and the like). In some implementations, the ROI 110 is recalculated at an interval less than for each input image 104. For example, in some implementations, the ROI 110 is recalculated every N-frames (e.g., a frame interval). As another example, in some implementations, the ROI 110 is not recalculated for a particular frame or input image 104 in response to an estimated computation time or amount of resources required for recalculating the ROI 110 exceeding a threshold. In other implementations, the ROI 110 does not change across frames or input images 104.

Figure 4A:
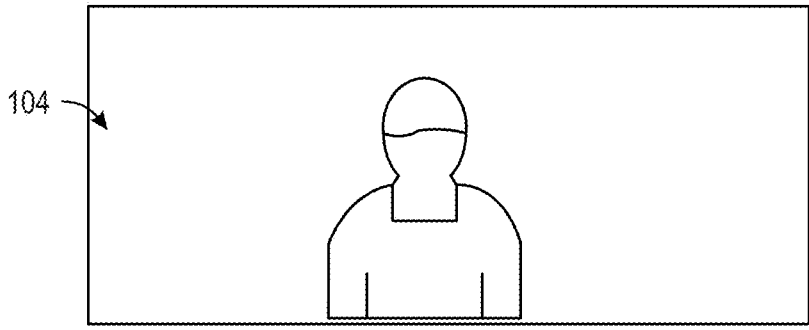
FIG. 4A is a pictorial depiction of part of a process flow for region-of-interest (ROI)-based image enhancement using a residual network according to some implementations.
Figure 4B:
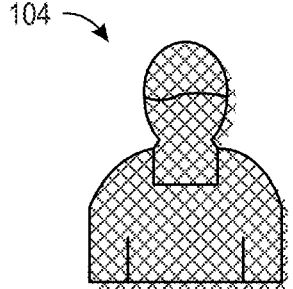
FIG. 4B is a pictorial depiction of part of a process flow for region-of-interest (ROI)-based image enhancement using a residual network according to some implementations.

FIGS. 4A-4E are pictorial diagrams showing an example process flow for region-of-interest (ROI)-based image enhancement using a residual network according to some implementations of the present disclosure. FIG. 4A shows an example input image 104 of a person. FIG. 4B shows an example ROI 110 for the input image 104 of FIG. 1A. Here, the ROI 110 is the person depicted in the input image 104, excluding the background of the input image 104. As an example, the ROI 110 is encoded as or corresponds to a segmentation mask defining the pixels of the input image 104 capturing the person.

Figure 4C:
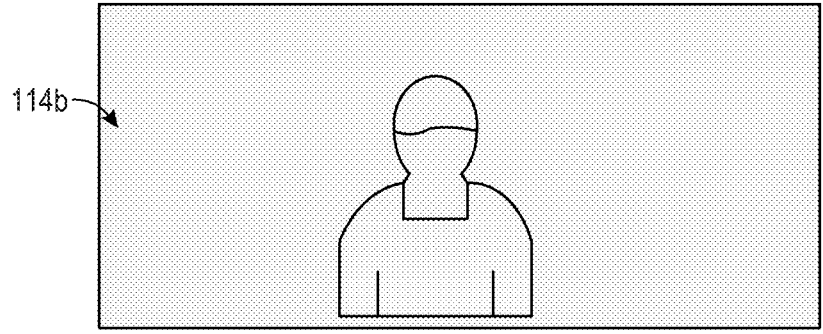
FIG. 4C is a pictorial depiction of part of a process flow for region-of-interest (ROI)-based image enhancement using a residual network according to some implementations.
Figure 4D:
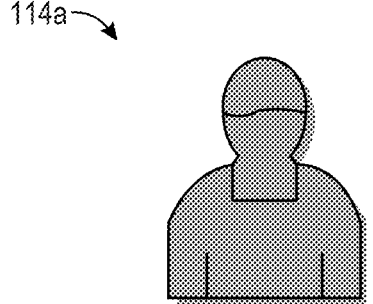
FIG. 4D is a pictorial depiction of part of a process flow for region-of-interest (ROI)-based image enhancement using a residual network according to some implementations.

FIG. 4C shows an output 114b resulting from providing the input image 104 of FIG. 1A to a skip path 108 of a residual network 102. Here, the output 114b is shown as shaded compared to the input image 104 of FIG. 1A to represent some amount of processing, enhancement, or transformation by the skip path 108 of the residual network 102. FIG. 4D shows an output 114a resulting from applying the residual path 108 of the residual network 102 to the input feature map 302 subspace corresponding to the ROI 110. Here, the ROI 110 is shown using a different shade to represent the different degree of processing, enhancement, or transformation by the residual path 106.

Figure 4E:
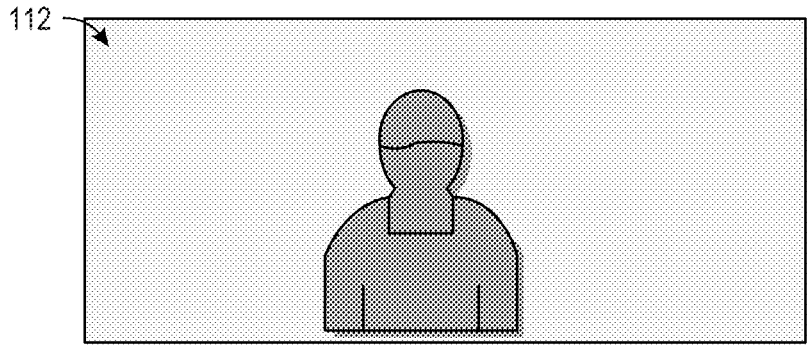
FIG. 4E is a pictorial depiction of part of a process flow for region-of-interest (ROI)-based image enhancement using a residual network according to some implementations.

FIG. 4E shows an example output image 112. Here, the output 114b has been mapped onto the output 114a. This results in an output image 112 showing a person that has been enhanced using the higher quality, computationally expensive processing of the residual path 106 and a background that has been enhanced using the lower quality, less expensive processing of the skip path 108.

Figure 5:
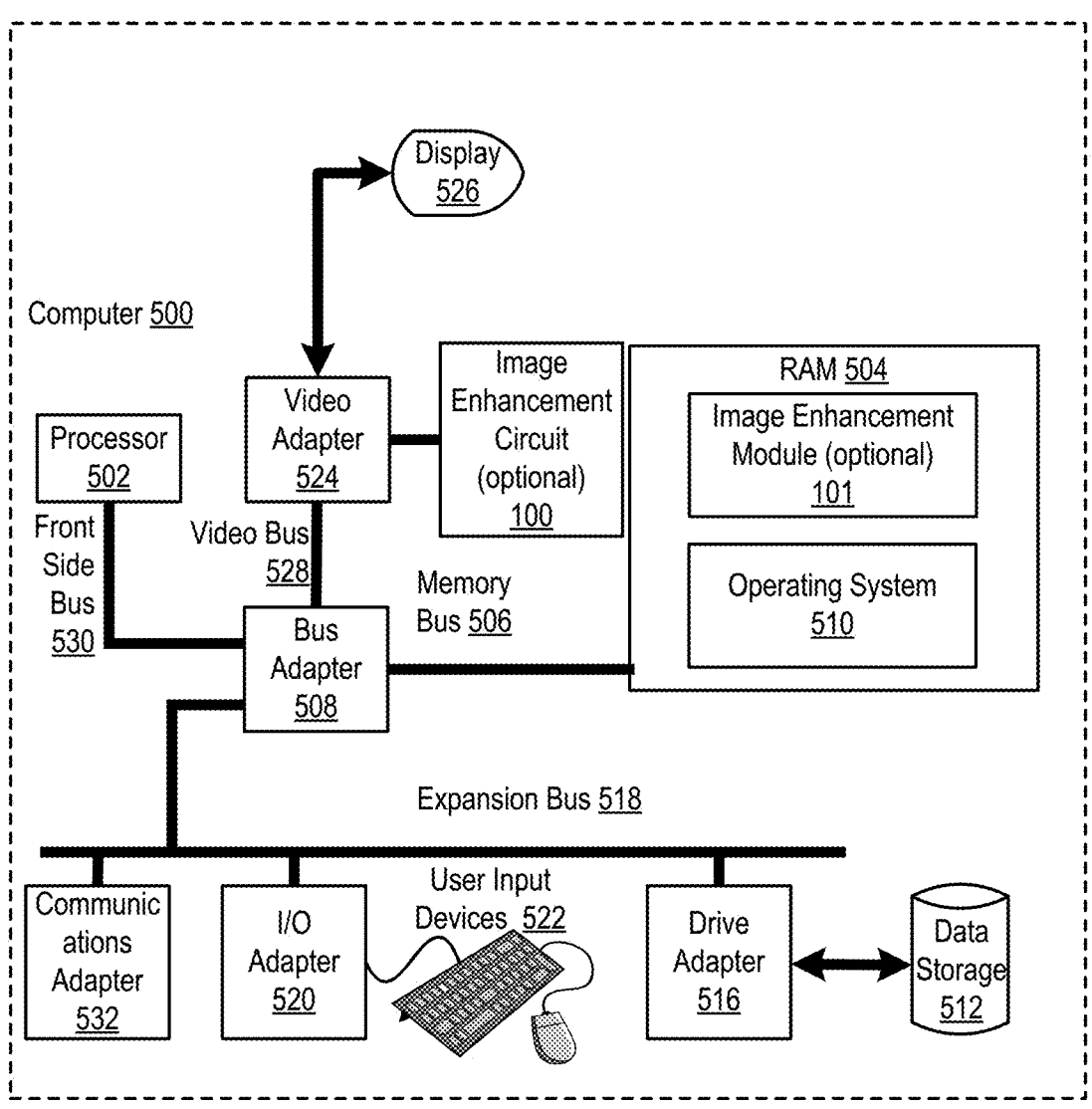
FIG. 5 is a block diagram of an example computer for region-of-interest (ROI)-based image enhancement using a residual network according to some implementations.

In some implementations, the approaches set forth herein for region-of-interest (ROI)-based image enhancement using a residual network are implemented using one or more general purpose computing devices, such as the exemplary computer 500 of FIG. 5. The computer 500 includes at least one processor 502. In addition to the at least one processor 502, the computer 500 of FIG. 5 includes random access memory (RAM) 504 which is connected through a high speed memory bus 506 and bus adapter 508 to processor 52 and to other components of the computer 500. Stored in RAM 504 is an operating system 510. The operating system 510 in the example of FIG. 5 is shown in RAM 504, but many components of such software typically are stored in non-volatile memory also, such as, for example, on data storage 512, such as a disk drive. Also stored in RAM 504 is an optional image enhancement module 101 which comprises computer program instructions that, when executed, cause the computer 500 to carry out the ROI-based image enhancement described above in accordance with variations of the present disclosure. The module 101 is described here as 'optional' because in some implementation, the ROI-based image enhancement is carried out by one or more standalone hardware components such as the image enhancement circuit 100. That is, the ROI-based image enhancement can optionally be carried out through execution of the image enhancement module 101 or through operation of the image enhancement circuit 100. In the example of FIG. 5 the optional image enhancement circuit 100 is coupled to a video adapter 524 (or graphics processing unit) to provide ROI-based image enhancement in accordance with variations of the present disclosure. Such a circuit 100, in some implementations, is a component of the processor 502, of the video adapter 524, or of some other GPU or accelerator.

The computer 500 of FIG. 5 includes disk drive adapter 516 coupled through expansion bus 518 and bus adapter 508 to processor 52 and other components of the computer 500. Disk drive adapter 516 connects non-volatile data storage to the computer 500 in the form of data storage 512. Such disk drive adapters include Integrated Drive Electronics ('IDE') adapters, Small Computer System Interface (SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 500 of FIG. 5 includes one or more input/output (I/O') adapters 520. I/O adapters implement user-oriented input/output through, for example, software drivers and computer hardware for controlling output to display devices such as computer display screens, as well as user input from user input devices 522 such as keyboards and mice. The example computer 500 of FIG. 5 includes a video adapter 524, which is an example of an I/O adapter specially designed for graphic output to a display device 526 such as a display screen or computer monitor. Video adapter 524 is connected to processor 52 through a high speed video bus 528, bus adapter 508, and the front side bus 530, which is also a high speed bus.

The exemplary computer 500 of FIG. 5 includes a communications adapter 532 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 532 implement the hardware level of data communications through which one computer sends data communications to another computer, directly or through a data communications network. Such communication adapters 532 include modems for wired dial-up communications, Ethernet (IEEE 802.3) adapters for wired data communications, and 802.11 adapters for wireless data communications.

Figure 6:
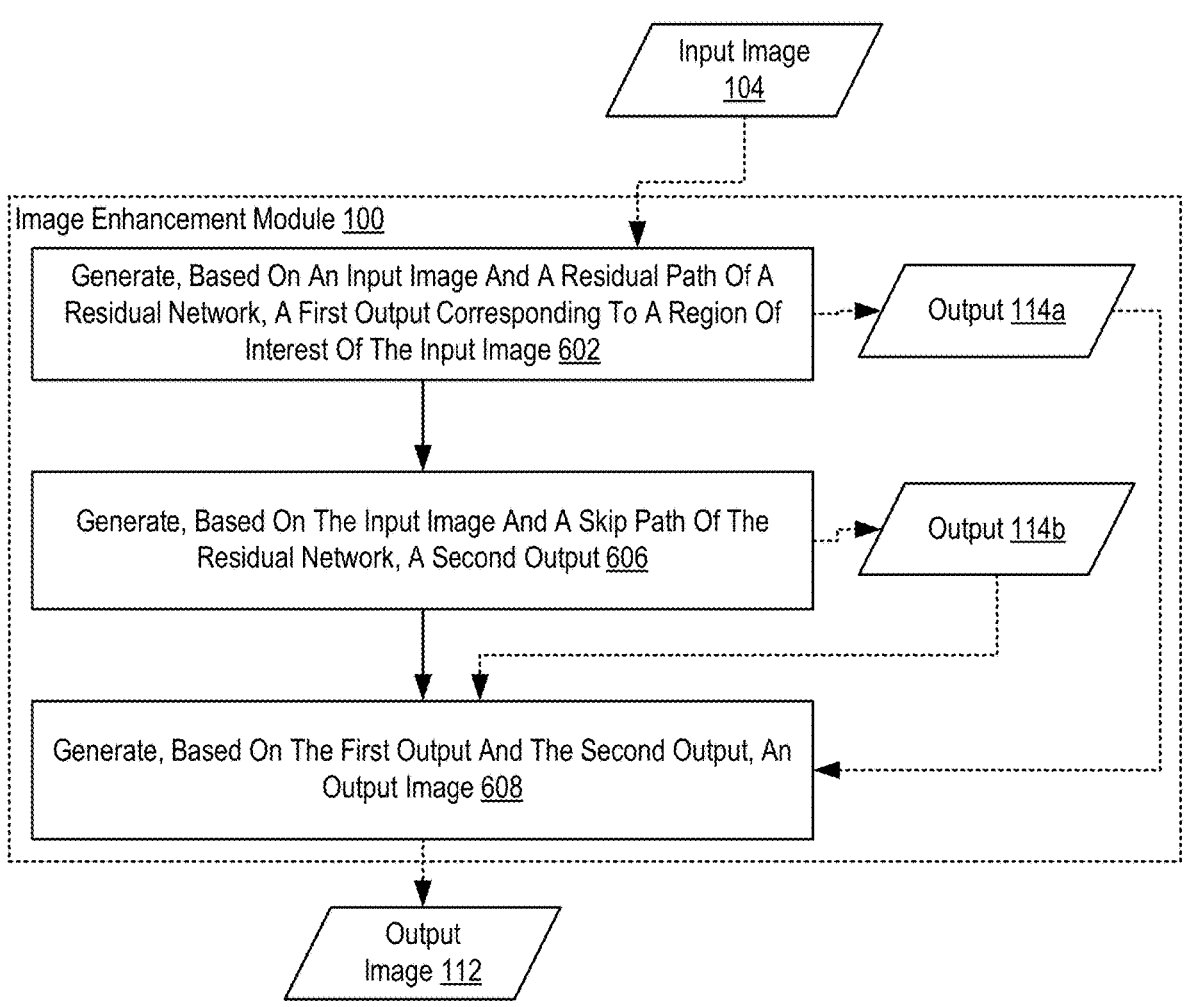
FIG. 6 is a flowchart of an example method for region-of-interest (ROI)-based image enhancement using a residual network according to some implementations.
Figure 7:
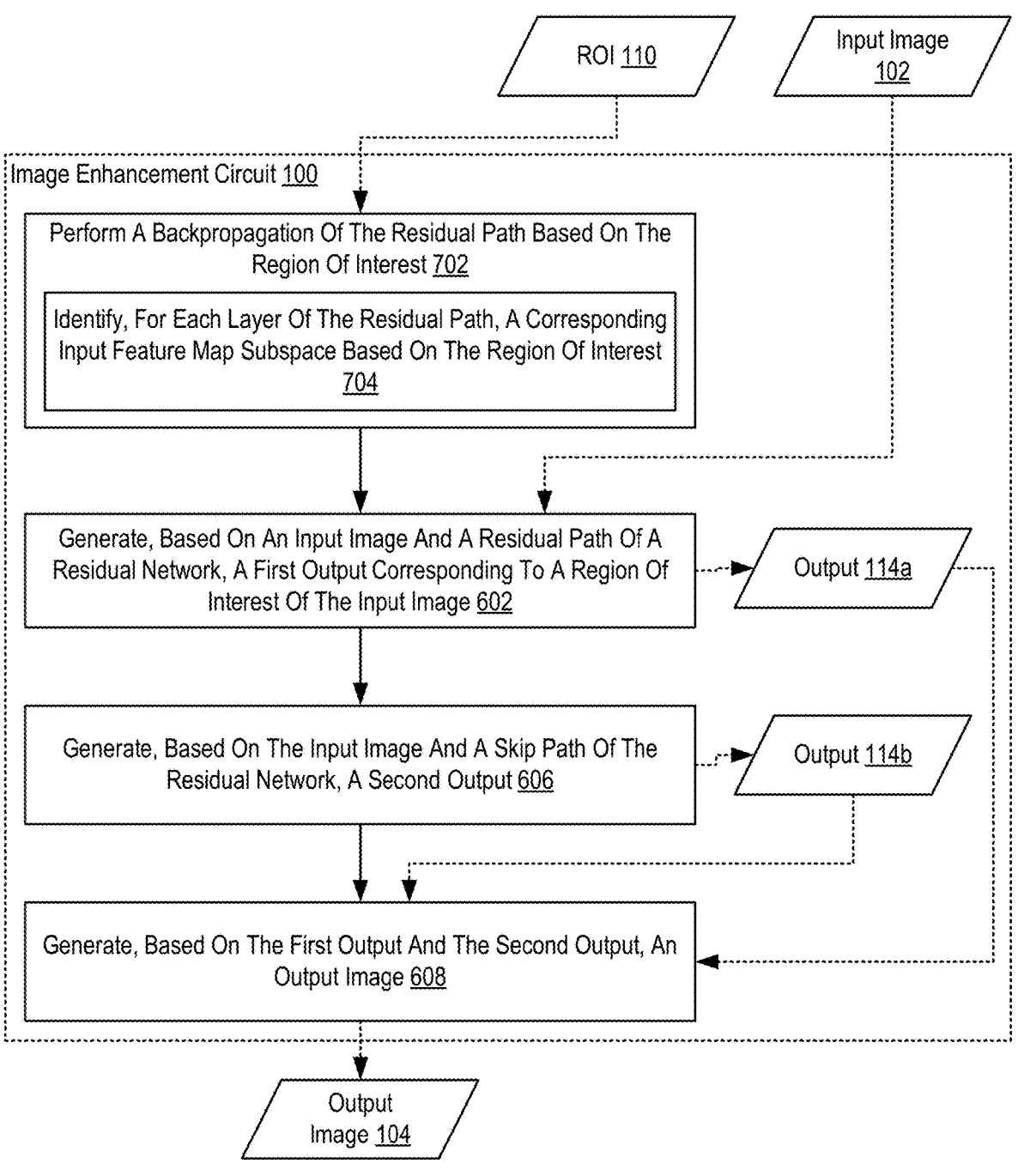
FIG. 7 is a flowchart of another example method for region-of-interest (ROI)-based image enhancement using a residual network according to some implementations.
Figure 8:
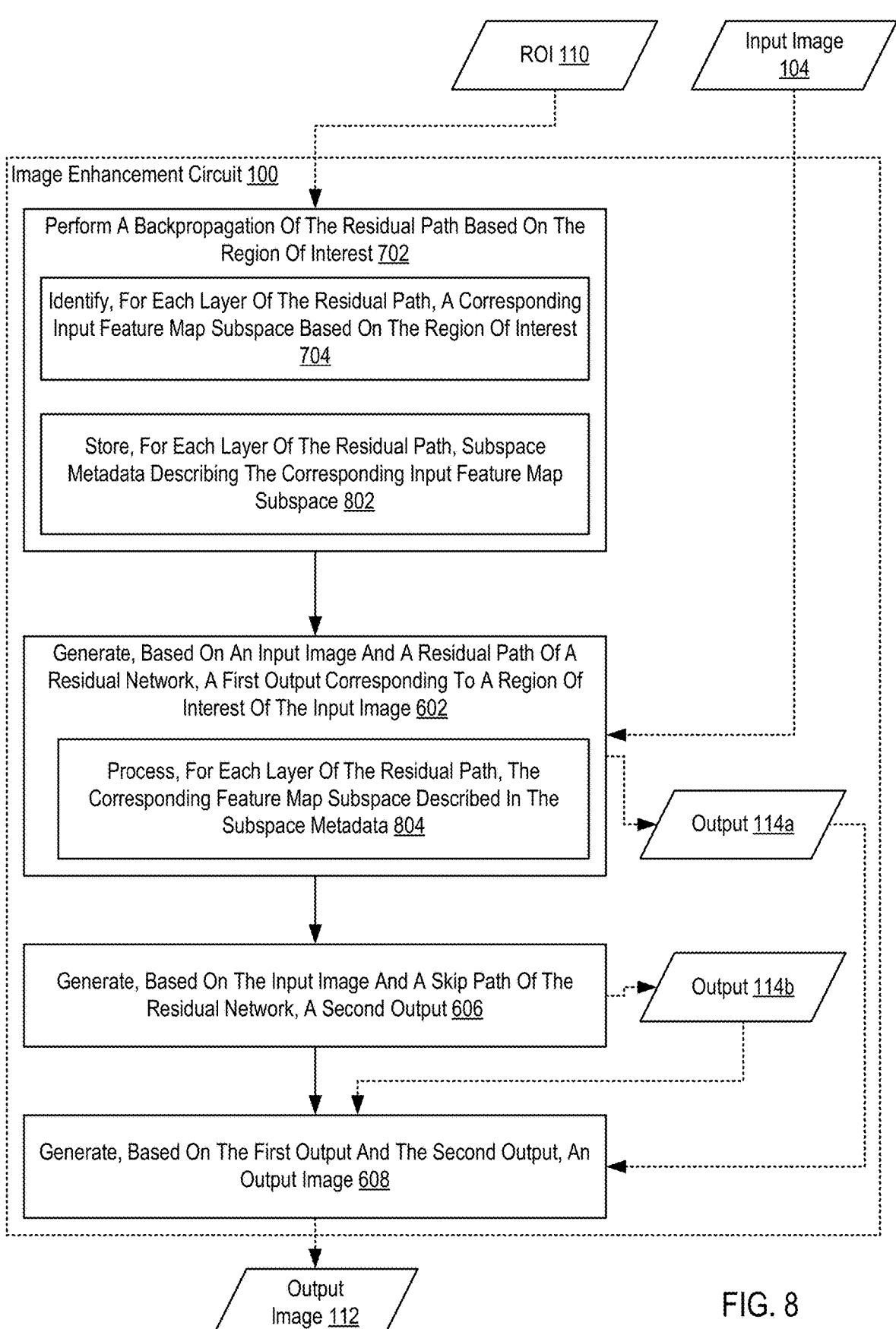
FIG. 8 is a flowchart of another example method for region-of-interest (ROI)-based image enhancement using a residual network according to some implementations.

The approaches described above for region-of-interest (ROI)-based image enhancement using a residual network are also described as methods in the flowcharts of FIGS. 6-8. Accordingly, for further explanation, FIG. 6 sets forth a flow chart illustrating an example method for region-of-interest (ROI)-based image enhancement using a residual network according to some implementations of the present disclosure. The method of FIG. 6 is performed, for example, by an image enhancement circuit 100 as described in FIG. 1. The method of FIG. 6 includes generating 802, based on an input image 104 and a residual path 106 of a residual network 102, a first output 114a corresponding to a region of interest (ROI) 110 of the input image 104. The input image 104 includes any digitally encoded image as can be appreciate by one skilled in the art. The ROI 110 defines an area of an image (e.g., the input image 104) that is indicated as serving a particular purpose or having a particular importance. Accordingly, in some implementations, generating 602 the first output 114*a* includes identifying the ROI 110 by applying an object identification algorithm, an image segmentation algorithm, or other algorithm as can be appreciated to identify the ROI 110.

The residual network 102 is a neural network (e.g., a convolutional neural network and the like) that performs image enhancement, processing, or transformations based on an input image 104. As an example, the residual network 102 performs sharpening, denoising, upscaling, or other transformations and enhancements as can be appreciated. The residual network 102 includes a residual path 106 and a skip path 108. Processing an input using the residual path 106 includes performing a forward inference processed through each layer 300 of the residual network 102. Processing an input using the skip path 108 includes performing a forward inference that skips or bypasses one or more layers 300 of the residual network 102. Accordingly, generating 602 the first output corresponding to the ROI 110 includes performing a forward inference on the residual path 104 with each layer 300 on the residual path processing a subset of its received input feature map 302 (e.g., an input feature map 302 subspace) that is a factor or affects pixels or data in the ROI 110. Thus, the residual path 106 only processes data necessary to generate an output 114*a* corresponding to the ROI 110.

The method of FIG. 6 also includes generating 606, based on the input image 104 and a skip path 108 of the residual network 102, a second output 114*b*. As is set forth above, the skip path 108 includes a subset of the layers 300 of the residual path 106 such that processing an input using the skip path 108 uses less power and fewer computational resources compared to the residual path 106. Though the skip path 108 uses less power and fewer computational resources compared to the residual path 106, in some implementations the skip path 108 produces an image output having a visually perceptive reduction in quality compared to output from the residual path 106. Accordingly, generating 606 the second output 114*b* includes performing a forward inference on the skip path 108 using the input image 104 as the initial input to the skip path 108. The resulting output 114*b* includes version of the whole input image 104 that has been processed using the skip path 108.

The method of FIG. 6 also includes generating 608, based on the first output 114*a* and the second output 114*b*, an output image 112. In some implementations, the output image 112 is generated 608 by combining the first output 114*a* and the second output 114*b*. For example, as the first output 114*a* corresponds to a subset of the input image 104 defined by the ROI 110, in some implementations generating 608 output image 112 includes mapping the pixels or data from the first output 114*a* onto the second output 114*b*.

For further explanation, FIG. 7 sets forth a flow chart illustrating an example method for region-of-interest (ROI)-based image enhancement using a residual network according to some implementations of the present disclosure. The method of FIG. 7 is similar to FIG. 6 in that the method of FIG. 7 includes: generating 802, based on an input image 104 and a residual path 106 of a residual network 102, a first output 114*a* corresponding to a region of interest (ROI) 110 of the input image 104; generating 606, based on the input image 104 and a skip path 108 of the residual network 102, a second output 114*b*; and generating 608, based on the first output 114*a* and the second output 114*b*, an output image 112.

The method of FIG. 7 differs from FIG. 6 in that the method of FIG. 7 includes performing 702 a backpropagation of the residual path 106 based on the ROI 110. Performing 702 the backpropagation includes traversing the residual path 106 starting from the output layer 300 to the input layer 300 and performing, at each layer, a particular operation. Accordingly, in some implementations, performing 702 the backpropagation includes identifying 704, for each layer 300 of the residual path 106, a corresponding input feature map 302 subspace based on the ROI 110.

For a current given layer 300 in the backpropagation, an output feature map 304 subspace has been determined by virtue of having previously propagated through a next layer 300 in the residual path 300. In the case of the output layer 300, the output feature map 304 subspace is the portion of the output feature map 304 for the output layer 304 corresponding to the ROI 110. For every other layer 300, the output feature map 304 subspace for the given layer 300 is the selected input feature map 302 subspace for the successive layer 300 previously traversed during the backpropagation.

Accordingly, for the given layer 300 and having a determined output feature map 304 subspace, the input feature map 302 subspace for the given later 300 includes those values or data in the input feature map 304 that are factors in or otherwise affect some portion of the determined output feature map 304. Thus, values or data in the input feature map 304 that do not affect the output feature map 304 subspace are not included in the input feature map 302 subspace. Having identified the input feature map 302 subspace for a given layer 300, the identified input feature map 302 subspace serves as the output feature map 304 subspace for the next layer 300 in the backpropagation (e.g., the preceding layer 300 in the residual path 106). The identified feature map 302 subspaces are then used in generating 602 the first output 114*a* using the residual path 106 as is described in further detail below.

For further explanation, FIG. 8 sets forth a flow chart illustrating an example method for region-of-interest (ROI)-based image enhancement using a residual network according to some implementations of the present disclosure. The method of FIG. 8 is similar to FIG. 7 in that the method of FIG. 8 includes: performing 702 a backpropagation of the residual path 106 based on the ROI 110 including identifying 704, for each layer 300 of the residual path 106, a corresponding input feature map 302 subspace based on the ROI 110; generating 802, based on an input image 104 and a residual path 106 of a residual network 102, a first output 114*a* corresponding to a region of interest (ROI) 110 of the input image 104; generating 606, based on the input image 104 and a skip path 108 of the residual network 102, a second output 114*b*; and generating 608, based on the first output 114*a* and the second output 114*b*, an output image 112.

The method of FIG. 8 differs from FIG. 7 in performing 702 the backpropagation of the residual path 106 based on the ROI 110 includes storing 802, for each layer 300 of the residual path 106, subspace metadata describing the corresponding input feature map 302 subspace. For example, assuming that the input feature map 302 subspace for a given layer 300 has been identified 704 during the backpropagation. Subspace metadata describing the particular input feature map 302 subspace for that layer 300 is stored. Thus, after the backpropagation, each layer 300 of the residual path 106 has subspace metadata describing the particular input feature map 302 subspace that affects the ROI 110 of the resulting output.

The method of FIG. 8 further differs from FIG. 7 in that generating 602 the first output 114 includes processing 804, for each layer 300 of the residual path 106, the corresponding feature map 302 subspace described in the subspace metadata. As an example, during forward inference on the residual path 106, a given layer 300 has received an input feature map 302 from a preceding layer 300. The subspace metadata for the given layer 300 is accessed to determine the input feature map 302 subspace that should be selected from the input feature map 302. The input feature map 302 subspace is then processed using the given layer 300 without processing other data from the input feature map 302 excluded from the subspace. Thus, computational and power resources are saved by only processing, for a given layer 300, the data in the input feature map 302 subspace that affects output corresponding to the ROI 110.

In view of the explanations set forth above, readers will recognize that the benefits of region-of-interest (ROI)-based image enhancement using a residual network include improved performance of a computing system by reducing overall power usage and computational resource consumption through selectively processing the region-of-interest by a higher cost residual data path of a residual network and processing the remainder of the image using a lower cost skip path of the residual network.

Exemplary implementations of the present disclosure are described largely in the context of a fully functional computer system for region-of-interest (ROI)-based image enhancement using a residual network. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a circuit, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method of region-of-interest (ROI)-based image enhancement using a residual network, the method comprising:

generating, based on an input image and a residual path of a residual network, a first output corresponding to a region-of-interest of the input image;

generating, based on the input image and a skip path of the residual network, a second output; and generating an output image based on the first output and the second output, wherein an ROI of the output image corresponding with the ROI of the input image comprises the first output, wherein a remaining portion of the output image comprises the second output, and wherein the ROI of the input image and the ROI of the output image match one another and correspond to a portion of the input image.

2. The method of claim 1, wherein the region-of-interest of the input image comprises a segmentation mask, and wherein generating the output image includes mapping pixels from the first output onto the second output at the ROI of the output image.

3. The method of claim 1, further comprising performing a backpropagation of the residual path based on the region-of-interest, including identifying, for each layer of the residual path, a corresponding input feature map subspace based on the region-of-interest.

4. The method of claim 1, wherein performing the backpropagation further comprises storing, for each layer of the residual path, subspace metadata describing the corresponding input feature map subspace.

5. The method of claim 4, wherein generating the first output comprises processing, for each layer of the residual path, the corresponding input feature map subspace described in the subspace metadata.

6. The method of claim 1, wherein the input image comprises a frame of video data, and wherein the region-of-interest comprises a dynamic region-of-interest that is variable across a plurality of frames of the video data.

7. An apparatus for region-of-interest (ROI)-based image enhancement using a residual network, the apparatus comprising:

a computer processor;

a computer memory operatively coupled to the computer processor; and an image enhancement circuit, wherein the image enhancement circuit comprises logic configured to:

generate, based on an input image and a residual path of a residual network, a first output corresponding to a region-of-interest of the input image;

generate, based on the input image and a skip path of the residual network, a second output; and generate an output image based on the first output and the second output, wherein an ROI of the output image corresponding with the ROI of the input image comprises the first output, wherein a remaining portion of the output image comprises the second output, and wherein the ROI of the input image and the ROI of the output image match one another and correspond to a portion of the input image.

8. The apparatus of claim 7, wherein the region-of-interest comprises a segmentation mask.

9. The apparatus of claim 7, wherein the residual network comprises an image enhancement neural network.

10. The apparatus of claim 7, wherein image enhancement circuit is further configured to perform a backpropagation of the residual path based on the region-of-interest, including identifying, for each layer of the residual path, a corresponding input feature map subspace based on the region-of-interest.

11. The apparatus of claim 10, wherein performing the backpropagation further comprises storing, for each layer of the residual path, subspace metadata describing the corresponding input feature map subspace.

12. The apparatus of claim 11, wherein generating the first output comprises processing, for each layer of the residual path, the corresponding input feature map subspace described in the subspace metadata.

13. The apparatus of claim 7, wherein the input image comprises a frame of video data, and wherein the regionof-interest comprises a dynamic region-of-interest that is variable across a plurality of frames of the video data.

14. A computer program product comprising a non-transitory computer readable storage medium, the computer program product comprising computer program instructions for region-of-interest (ROI)-based image enhancement using a residual network that, when executed, cause a computer system to perform steps comprising:

generating, based on an input image and a residual path of a residual network, a first output corresponding to a region-of-interest of the input image;

generating, based on the input image and a skip path of the residual network, a second output; and generating an output image based on the first output and the second output, wherein an ROI of the output image corresponding with the ROI of the input image comprises the first output, wherein a remaining portion of the output image comprises the second output, and wherein the ROI of the input image and the ROI of the output image match one another and correspond to a portion of the input image.

15. The computer program product of claim 14, wherein the region-of-interest comprises a segmentation mask.

16. The computer program product of claim 14, wherein the residual network comprises an image enhancement neural network.

17. The computer program product of claim 14, wherein the steps further comprise performing a backpropagation of the residual path based on the region-of-interest, including identifying, for each layer of the residual path, a corresponding input feature map subspace based on the region-of-interest.

18. The computer program product of claim 17, wherein performing the backpropagation further comprises storing, for each layer of the residual path, subspace metadata describing the corresponding input feature map subspace.

19. The computer program product of claim 18, wherein generating the first output comprises processing, for each layer of the residual path, the corresponding input feature map subspace described in the subspace metadata.

\* \* \* \* \*